US012739694B2

(12) United States Patent
Hong et al.

(10) Patent No.: US 12,739,694 B2
(45) Date of Patent: Sep. 15, 2026

(54) METHOD FOR INFORMATION TRANSMISSION, AND COMMUNICATION DEVICE

(71) Applicant: BEIJING XIAOMI MOBILE SOFTWARE CO., LTD., Beijing (CN)

(72) Inventors: Wei Hong, Beijing (CN); Ming Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 610 days.

(21) Appl. No.: 18/010,791

(22) PCT Filed: Jul. 22, 2020

(86) PCT No.: PCT/CN2020/103429

§ 371 (c)(1),
(2) Date: Dec. 15, 2022

(87) PCT Pub. No.: WO2022/016406

PCT Pub. Date: Jan. 27, 2022

(65) Prior Publication Data

US 2023/0239726 A1 Jul. 27, 2023

(51) Int. Cl.
*H04W 28/02* (2009.01)

(52) U.S. Cl.
CPC ............................... *H04W 28/0268* (2013.01)

(58) Field of Classification Search
CPC ........................... H04W 28/0268; H04L 47/02
See application file for complete search history.

(56) References Cited

U.S. PATENT DOCUMENTS

| | | | | |
|---|---|---|---|---|
| 9,351,308 | B2 | 5/2016 | Narkar et al. | |
| 2005/0188407 | A1 | 8/2005 | Van Beek et al. | |
| 2013/0242903 | A1 | 9/2013 | Narkar et al. | |
| 2018/0181592 | A1* | 6/2018 | Chen | G06N 3/08 |
| 2019/0354797 | A1* | 11/2019 | Nesta | G06F 18/256 |
| 2020/0293753 | A1* | 9/2020 | Sehgal | H04L 63/0861 |
| 2021/0012770 | A1* | 1/2021 | Choudhary | G06F 3/017 |
| 2022/0126864 | A1* | 4/2022 | Moustafa | B60W 60/0013 |

FOREIGN PATENT DOCUMENTS

| | | | |
|---|---|---|---|
| CN | 104170337 | A | 11/2014 |
| CN | 106598243 | A | 4/2017 |
| CN | 107480196 | A | 12/2017 |

(Continued)

OTHER PUBLICATIONS

OA for Indian Application No. 202327006321 dated Aug. 28, 2023, with partial English translation, (5p).

(Continued)

*Primary Examiner* — Asad M Nawaz
*Assistant Examiner* — Najeeb Ansari
(74) *Attorney, Agent, or Firm* — Arch & Lake LLP; Hao Tan; Shen Wang

(57) ABSTRACT

A method for information transmission is performed by a base station. The method comprises: obtaining weights corresponding to different input modalities; and on the basis of input data of at least one input modality and a weight of an input modality corresponding to each item of input data, determining a processing result of the input data.

8 Claims, 3 Drawing Sheets acquiring weights corresponding to different input modalities — 201 determining a processing result of input data based on the input data of at least one input modality and the weight of the input modality corresponding to each input data — 202

(56) References Cited

FOREIGN PATENT DOCUMENTS

CN 107911156 A 4/2018

OTHER PUBLICATIONS

International Search Report of PCT/CN2020/103429 dated Apr. 9, 2021 with English translation, (4p).
Supplementary European Search Report for EP application 20945998.1 dated Mar. 6, 2024, (9p).
Xiaomi, “Multi-modality Interaction,” S1 Rel-18 Study Proposal—motivations, use cases and objectives, May 8, 2020, (6p).
Xiaomi, “Study on the Support for Multi-modality Interaction,” 3GPP TSG-SA WG1 Meeting #90-e, S1-202286, E-meeting, May 18-22, 2020, (3p).
Anara Sandygulova et al., “Ubiquitous Human Perceptionfor Real-Time Gender Estimation,” 2013 10th International Conference on Ubiquitous Robots and Ambient Intelligence(URAI), Ramada Plaza Jeju Hotel, Jeju, Korea, Oct. 31-Nov. 2, 2013, (6p).

* cited by examiner

METHOD FOR INFORMATION TRANSMISSION, AND COMMUNICATION DEVICE

CROSS-REFERENCE TO RELATED APPLICATION

This application is the U.S. national application of International Application No. PCT/CN2020/103429, filed on Jul. 22, 2020, the entire disclosure of which is incorporated herein by reference for all purposes.

TECHNICAL FIELD

The present disclosure relates to but not limited to a field of wireless communication technologies, and particularly to a method and an apparatus for information transmission, and a communication device.

BACKGROUND

Smart interaction is an important application scenario of next generation mobile communication, such as 6th generation (6G) mobile communication. Smart interaction is generated between agents (including human and a smart device). Most of the existing agent interactions are passive, which depend on input of demands. For example, in voice and visual interaction between human and smart home, input is single modal.

SUMMARY

According to a first aspect of the present disclosure, a method for information transmission is performed by a base station. The method includes:

- acquiring weights corresponding to different input modalities; and
- determining, based on input data of at least one input modality and a weight of an input modality corresponding to each input data, a processing result of the input data.

According to a second aspect of the present disclosure, a communication device is provided. The communication device includes a processor, a transceiver, a memory and an executable program stored on the memory. When the executable program is executed by the processor, the processor is configured to: acquire weights corresponding to different input modalities; and determine, based on input data of at least one input modality and a weight of an input modality corresponding to each input data, a processing result of the input data.

According to a third aspect of the present disclosure, a storage medium having an executable program stored is provided. When the executable program is executed by a processor, steps of the method for information transmission as described in the first aspect are implemented. The method includes: acquiring weights corresponding to different input modalities; and determining, based on input data of at least one input modality and a weight of an input modality corresponding to each input data, a processing result of the input data.

It should be noted that, the details above and in the following are exemplary and explanatory, and do not constitute the limitation on the present disclosure.

BRIEF DESCRIPTION OF THE DRAWINGS

The drawings herein are incorporated into the specification and constitute a part of the specification, illustrate embodiments in conformity with the present disclosure, and explain the principle of embodiments of the present disclosure together with the specification.

DETAILED DESCRIPTION

The embodiments will be described in detail here, examples of which are shown in the accompanying drawings. When the following descriptions refer to the accompanying drawings, unless otherwise indicated, the same numbers in different drawings represent the same or similar elements. The implementations described in the following embodiments do not represent all implementations consistent with embodiments of the present disclosure. Rather, they are merely examples of apparatuses and methods consistent with some aspects of the disclosure.

The terms described in the embodiments of the present disclosure are only for the purpose of describing specific embodiments and are not intended to limit the embodiments of the present disclosure. The singular forms "a/an", "said" and "the" used in the embodiments of the disclosure and the appended claim are also intended to include plural forms, unless the context clearly indicates otherwise. It should also be understood that the term "and/or" used in the present disclosure means and includes any or all possible combinations of one or more associated listed items.

It should be understood that, although the terms first, second, third, etc. may be used in embodiments of the present disclosure to describe various information, such information may not be limited to these terms. These terms are only used to distinguish the same category of information. For example, without departing from the scope of embodiments of the present disclosure, first information may also be referred to as second information, and similarly, second information may also be referred to as first information. It depends on the context. For example, the word "if" as used herein may be interpreted as "in a case that" or "when" or "in response to determining".

Figure 1:
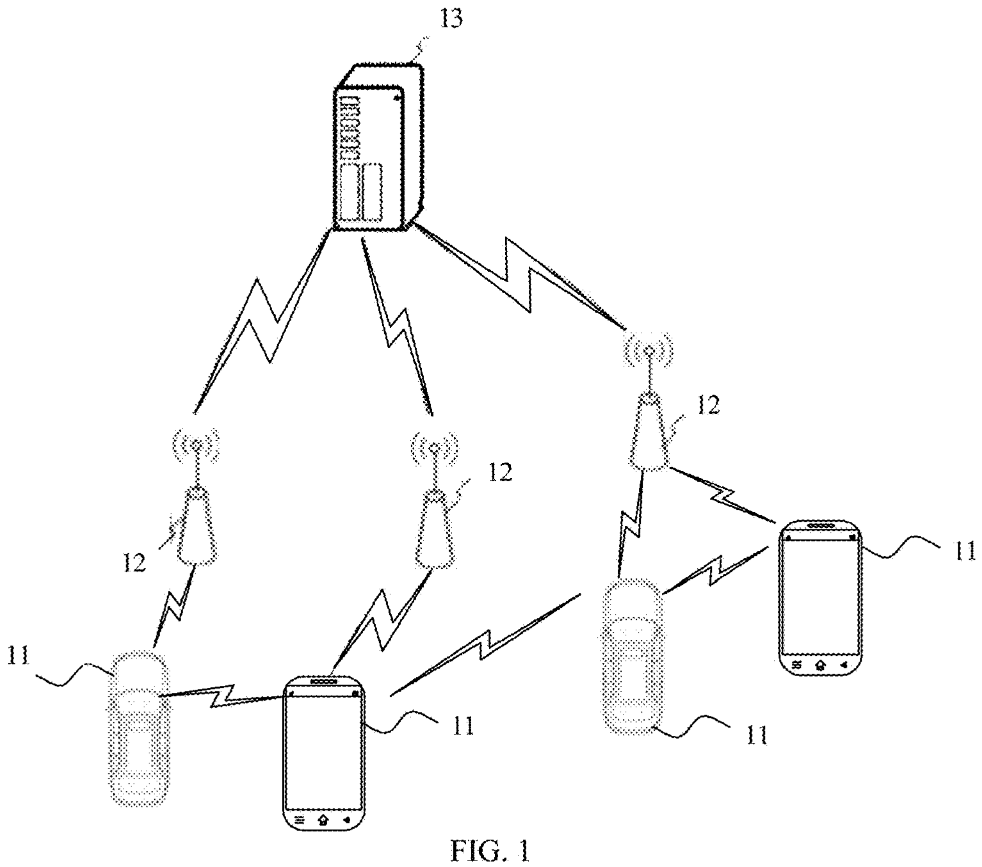
FIG. 1 is a structural diagram illustrating a wireless communication system according to an embodiment.

Referring to FIG. 1, it is a structural diagram illustrating a wireless communication system in embodiments of the present disclosure. As illustrated in FIG. 1, the wireless communication system is a communication system based on a cellular mobile communication technology. The wireless communication system may include several terminals 11 and several base stations 12.

The terminal 11 may refer to a device that provides voice and/or data connectivity for a user. The terminal 11 may communicate with one or more core networks through a radio access network (RAN). The terminal 11 may be an internet of things (IoT) terminal, for example, a sensor device, a mobile phone (or referred to as a cellular phone) and a computer having an IoT terminal. The terminal 11, for example, may be a fixed, portable, compact, handheld, computer built-in or vehicle-mounted apparatus, for example, a station (STA), a subscriber unit, a subscriber station, a mobile station, a mobile, a remote station, an access point, a remote terminal, an access terminal, a user terminal, a user agent, a user device or a user equipment (UE). Alternatively, the terminal 11 may be a device of an unmanned vehicle. Alternatively, the terminal 11 may also be a vehicle-mounted device, for example, may be a vehicle computer with a wireless communication function, or a wireless communication device externally connected to the vehicle computer. Alternatively, the terminal 11 also may be a roadside device, for example, may be a street lamp, a signal lamp or other roadside device with a wireless communication function.

The base station 12 may be a network side device in the wireless communications system. The wireless communication system may be a 4th generation mobile communication (4G) system, also referred to as a long term evolution (LTE) system; or the wireless communications system may be a 5G system, also referred to as a new radio (NR) system or a 5G NR system. Alternatively, the wireless communication system may be a next generation system of the 5G system. An access network in a 5G NR system may be referred to as a new generation-radio access network (NG-RAN). Alternatively, the wireless communications system may be a machine-type communication (MTC) system.

The base station 12 may be an evolved NodeB (eNB) adopted in a 4G system. Alternatively, the base station 12 may be a base station (gNB) with a centralized distributed architecture in a 5G system. When the base station 12 adopts the centralized distributed architecture, it generally includes a central unit (CU) and at least two distributed units (DU). Protocol stacks at a Packet Data Convergence Protocol (PDCP) layer, a Radio Link Control (RLC) layer and a Media Access Control (MAC) layer are configured in a CU; a physical (PHY) layer protocol is configured in a DU. The specific implementation of the base station 12 is not limited in embodiments of the disclosure.

The base station 12 may establish a wireless connection with the terminal 11 through a wireless interface. In different implementations, the wireless air interface is a wireless air interface based on a 4G standard; or, the wireless air interface is a wireless air interface based on a 5G standard, for example, the wireless air interface is a new air interface; or, the wireless air interface may be a wireless air interface based on a 5G-based next generation mobile communication network technology standard.

In some embodiments, an end to end (E2E) connection may also be established between the terminals 11, which may be applied to scenes such as vehicle to vehicle (V2V) communication, vehicle to infrastructure (V2I) communication and vehicle to pedestrian (V2P) communication in vehicle to everything (V2X).

In some embodiments, the wireless communication system may further include a network management device 13.

Several base stations 12 may be connected with the network management device 13. The network management device 13 may be a core network device in a wireless communication system, for example, the network management device 13 may be a mobility management entity (MME) in an evolved packet core (EPC). Alternatively, the network management device may be other core network devices, for example, a Serving GateWay (SGW), a Public Data Network GateWay (PGW), a Policy and Charging Rules Function (PCRF) or a Home Subscriber Server (HSS), etc. The implementation form of the network management device 13 is not limited in the embodiments of the disclosure.

In a 6G era, multi-modal interaction will become a normal state. Multi-modal interaction may include that, inputs from a plurality of devices or multiple kinds of inputs from one device are sent to a centralized processing device or function for comprehensively processing these multi-modal inputs, one or more outputs satisfying user demands are finally acquired. A plurality of outputs also may be performed by a plurality of devices or by one device.

The executive body involved in embodiments of the present disclosure includes but not limited to an access network device that supports cellular mobile communication such as a base station, and a core network device.

In the application scene of embodiments of the present disclosure, since a centralized processing device or a centralized processing function needs simultaneous and integrated processing based on inputs of a plurality of modalities to obtain a multi-modal output, reduction in input quality of a single modality may influence the quality of the entire multi-modal output.

Figure 2:
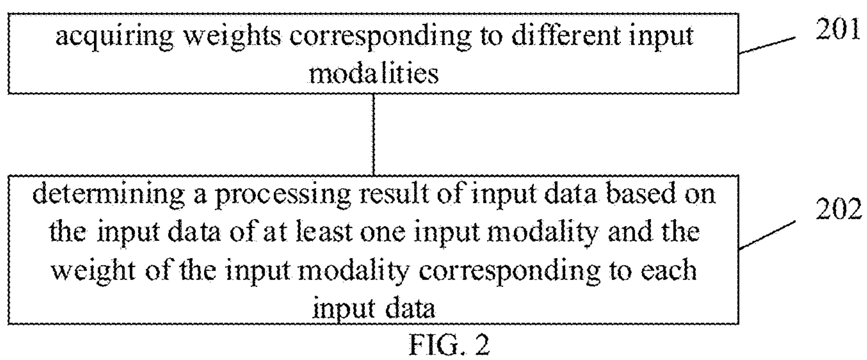
FIG. 2 is a flowchart illustrating a method for information transmission according to an embodiment.

A method for information transmission according to the embodiment may be applied to a base station and/or a core network device in a mobile communication network. As illustrated in FIG. 2, the method for information transmission may include the following steps:

At 201, weights corresponding to different input modalities are acquired; and At 202, a processing result of input data is determined based on the input data of at least one input modality and the weight of the input modality corresponding to each input data.

The origin or form of each kind of input data may be referred to as a kind of input modality. The input modality may be distinguished based on a medium of the input data, for example, a voice, a video, a text, etc. may be referred to as an input modality, respectively. Alternatively, the modality may be distinguished based on different ways for acquiring input data, for example, pieces of input data that are obtained by a sensor, a radar, an infrared ray and an accelerometer, respectively, may be referred to as input data of an input modality, respectively. Each of the above-mentioned modalities may be referred to as a modality.

The multi-modal data processing device such as the access network device and/or the core network device in the cellular mobile communication network may obtain a multi-modal processing result by processing the input data of at least one input modality, and output the processing result. The access network device may include a base station, etc., and a processing device with a processing capability in the base station may be used to process the input data.

The UE such as a mobile terminal and an IoT terminal in the cellular mobile communication network sends the input data acquired by an image sensor and an audio sensor.

The input data of at least one input modality may be input data of at least one input modality acquired by a plurality of UEs, and may also be input data of at least one input modality acquired by one UE. For example, the mobile terminal may acquire audio input data and video input data; or an IoT terminal may acquire audio input data, and another IoT terminal may acquire video input data.

The multi-modal data processing device may determine a multi-modal data processing result by big data analysis or AI processing of the input data of a plurality of input modalities. For example, in real-time speech recognition or translation, the multi-modal data processing device may perform speech recognition and image recognition on audio input data and video input data sent by a corresponding UE, and perform big data analysis or AI processing on a recognition result, further to determine a semantic or translation result.

In multi-modal data processing, correlation degrees between the input data of different input modalities and the processing result are different. For example, for speech recognition processing, the correlation degree with the audio input data is higher, and the video input data may be used as an auxiliary recognition means. For different multi-modal data processing needs, different weights may be set for different input modalities. The weight of the input modality with a higher correlation degree with the processing result is higher, and the weight of the input modality with a lower correlation degree with the processing result is lower. By setting the weights for input data of different input modalities, complementarity of input data of the different input modalities is enhanced in the multi-modal data processing, and the accuracy of the processing result is further enhanced.

The multi-modal data processing device may pre-store the weights of different input modalities. The pre-stored weights of the different input modalities are acquired in the multi-modal data processing procedure.

In the multi-modal data processing, the multi-modal data processing device may determine an output result based on the weights of the input data of the different input modalities. For example, in real-time translation, a weight of audio input data may be set to 90%, and a weight of video input data may be set to 10%; the audio input data and the video input data are comprehensively analyzed to determine a translation result.

In this way, the importance degrees of input data of different input modalities are distinguished by setting the weights of the input data of the different input modalities, and the complementarity of the input data of the different input modalities is adjusted using the weights, thus improving the accuracy of the multi-modal processing result.

In an embodiment, the weights corresponding to the different input modalities are determined based on quality of service (QOS) of the different input modalities.

The QOS may include a transmission delay and a transmission rate. In the multi-modal data processing, QoS of different input modalities may be different, that is, transmission delays and transmission rates of the input data of the different input modalities are different. Therefore, the information amount of the input data of the different input modalities received in the same time are not equivalent.

The weights of input modalities may be determined based on the QoS of different input modalities, to balance the non-equivalence of information amount of different input data generated due to the QoS.

For example, in the cellular mobile communication network, the QoS of audio input data, video input data and tactile input data may be different. The QoS of audio input data and tactile input data are higher, and the QoS of video input data is lower. When real-time multi-modal processing is performed, information amount that may appear in the video input data is less than that of audio data and tactile data, and in this case, the weight of the video input data may be enhanced. For example, the weight of the audio input data may account for 30%, the weight of the video input data may account for 40%, and the weight of the tactile input data may account for 30%.

A difference between the input data of different input modalities generated by different QoS of different input modalities may be balanced by the weights, which further improves the accuracy of the multi-modal processing result.

In an embodiment, the weights include:

a relative weight representing a proportion of each of the input modalities to all the input modalities;

or, absolute weights indicating importance degrees of the different input modalities using different weight values.

Here, the relative weight may be a weight proportion, that is, the evaluated function of an input modality in all the input modalities may be reflected in a proportion manner. For example, there are three modalities of audio input, video input and tactile input. The weight of audio input is 30%, the weight of video input is 40% and the weight of tactile input is 30%. The evaluated function of an input modality in all the input modalities may be reflected by the relative weight.

The absolute weights indicate the importance degrees of the different input modalities using different weight values. For example, there are three modalities of audio input, video input and tactile input. The weight of audio input is 3, the weight of video input is 4, the weight of tactile input is 3. The absolute weight of a single input modality may be not affected by other modalities. When a current input modality changes, for example, when a new input modality is added or an input modality is removed, the absolute weight of the input modality does not change. Therefore, the adaptability of weights may be enhanced.

In an embodiment, determining the processing result of the input data based on the input data of at least one input modality and the weight of the input modality corresponding to each input data, includes:

determining the processing result of the input data based on the input data of at least one input modality received by a mobile communication network and the weight of the input modality corresponding to each input data.

The UE such as a mobile terminal and an IoT terminal in the cellular mobile communication network sends input data of a plurality of input modalities to the access network device or the core network device through a mobile communication network.

Input data of the plurality of input modalities may be input data of each input modality acquired by a plurality of UEs, and may also be input data of each input modality acquired by one UE.

In an embodiment, acquiring the weights corresponding to different input modalities, includes:

receiving indication information for indicating the weights corresponding to the different input modalities; and acquiring pre-agreed weights corresponding to the different input modalities.

Figure 3:
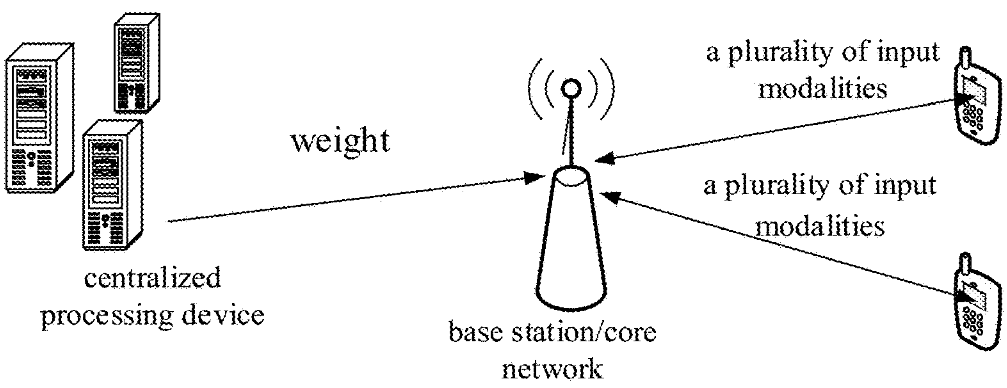
FIG. 3 is an architecture diagram illustrating multi-modal processing according to an embodiment.

As illustrated in FIG. 3, the centralized processing device or the centralized processing function may determine a weight corresponding to each input modality based on the needs of multi-modal processing, and send the weight to the access network device or the core network device. The centralized processing device may be a cloud processing device, etc. The centralized processing function may be a cloud function module for multi-modal processing, etc.

The weight corresponding to each input modality may be determined by a multi-modal input device such as the mobile terminal, the IoT terminal and other UEs based on the needs of multi-modal processing and sent to the access network device or the core network device.

The weight corresponding to each input modality may be pre-agreed, and stored in the access network device or the core network device.

In an embodiment, the method for information transmission further includes:

compensating for input data of at least one second input modality in the at least one input modality, by using input data of at least one first input modality in the at least one input modality based on a compensation rule.

In the multi-modal data processing, since the multi-modal data processing device needs simultaneous and integrated processing based on inputs of a plurality of input modalities to obtain a multi-modal processing result, reduction in input quality or data volume of input data of one input modality may influence the quality of the processing result of the entire multi-modal output. The input quality may include a transmission delay and/or a transmission rate.

Here, compensating for input data of the second input modality using the input data of the first input modality, may include: compensating for input quality of input data of the second input modality by improving the input quality of the input data of the first input modality.

The compensation rule may be configured based on corresponding relationship between different input modalities. For example, the input data of one second input modality may be compensated by the input data of the plurality of first input modalities, and the input data of the plurality of second input modalities may also be compensated by the input data of the plurality of first input modalities.

The compensation rule may also specify a corresponding relationship of compensation, for example, when an input modality A is reduced, it may be compensated by enhancing an input modality B, or may be compensated by enhancing an input modality C.

The compensation rule may specify a compensated data volume and/or a compensated input quality, etc. For example, the compensation rule may specify a compensation amount of the input data of the first input modality for compensating for the input data of the second input modality, etc. Here, the compensation amount may be a data volume or an input quality, etc.

For example, the data volume or the transmission quality of the audio input modality in the transmission process is reduced, and the base station or the core network may enhance the data volume or the transmission quality of the video input modality.

In this way, through compensation between different input modalities, the influence of changes in the input quality or the data volume of the input modality on the multi-modal processing result is reduced, and the quality of the multi-modal processing result is improved.

In an embodiment, compensating for input data of at least one second input modality in the at least one input modality using input data of at least one first input modality in the at least one input modality based on a compensation rule, includes:

compensating for QoS of the input data of the at least one second input modality using QoS of the input data of the at least one first input modality.

For example, when the transmission quality of the second input modality in the transmission process is reduced, for example, the QoS value decreases, the base station or the core network may enhance the transmission quality of the first modality input, for example, improve the QoS of other modality inputs. Therefore, the influence of the changes in the QoS of the input modality on the multi-modal processing result may be reduced, and the accuracy of the multi-modal processing result is further improved.

In an embodiment, the compensation rule is determined based on the weight of the first input modality and the weight of the second input modality.

The compensation rule may specify the compensated data volume and/or the compensated input quality, etc. For example, the compensation rule may specify the compensation amount of the input data of the first input modality for compensating for the input data of the second input modality, etc.

The compensation rule may determine the compensation amount based on the weight, for example, for the second input modality with a larger relative weight, more compensation amounts of the first input modality with a smaller relative weight may be adopted for compensation. For the second input modality with a smaller relative weight, fewer compensation amounts of the first input modality with a larger relative weight may be adopted for compensation.

For example, when the weight of the audio input modality accounts for 30%, the weight of video input data accounts for 40%. When the QoS of the audio input modality decreases by 10%, since the weight of the video input modality is larger, only fewer compensation amounts of the video input modality are needed for compensation, for example, the QoS of the video input modality may be improved by 5% for compensation.

In this way, the compensation amount between different input modalities is determined based on the weight, so that input data between different modalities in the multi-modal data processing may satisfy the needs of multi-modal processing, which reduces the influence of changes in the input quality or the data volume of the input modality on the multi-modal processing result, and improves the quality of the multi-modal processing result.

In an embodiment, the method for information transmission further includes at least one of:

receiving indication information for indicating the compensation rule; or acquiring a pre-agreed compensation rule.

The centralized processing device or the centralized processing function may determine the compensation rule based on the weight of each input modality, and send the compensation rule to the access network device or the core network device.

The compensation rule may be determined by the multi-modal input device such as the mobile terminal, the IoT terminal and other UEs based on the weight of each input modality and sent to the access network device or the core network device.

The compensation rule may be pre-agreed, and stored in the access network device or the core network device.

A specific example is provided in combination with the above any embodiment:

A method that ensures an output quality is provided in the disclosure.

1. The base station and/or the core network acquires weights of the plurality of input modalities.

The weights may be sent by the centralized processing device or function to the base station or the core network.

The weights may be sent by the multi-modal input device to the base station or the core network.

The weights may be relative values or absolute values.

The weights may be measured based on the QoS, for example, a delay, a rate, etc.

For example, the audio input accounts for 30%, the video input accounts for 40%, and the tactile input accounts for 30%.

2. The base station may acquire a compensation relationship between the plurality of input modalities, that is, the compensation rule.

For example, when the input A is reduced by a, it may be compensated by increasing B by b, or increasing C by c.

The compensation relationship may be sent by the centralized processing device or function to the base station or the core network.

3. When the transmission quality of a certain modality in the transmission process is reduced, for example, the QoS value decreases, the base station or the core network may enhance the transmission quality of other modality inputs, for example, improve the QoS of other modality inputs.

For example, when the QoS of the audio input decreases by 10%, the QoS of the video input increases by 5%, which may ensure the entire output quality or the accuracy.

The damage caused by the reduced input quality of one or more modalities may be compensated by enhancing the transmission quality of inputs of one or more modalities.

A specific compensation algorithm may be based on implementation or based on a compensation relationship between a plurality of input modalities.

Figure 4:
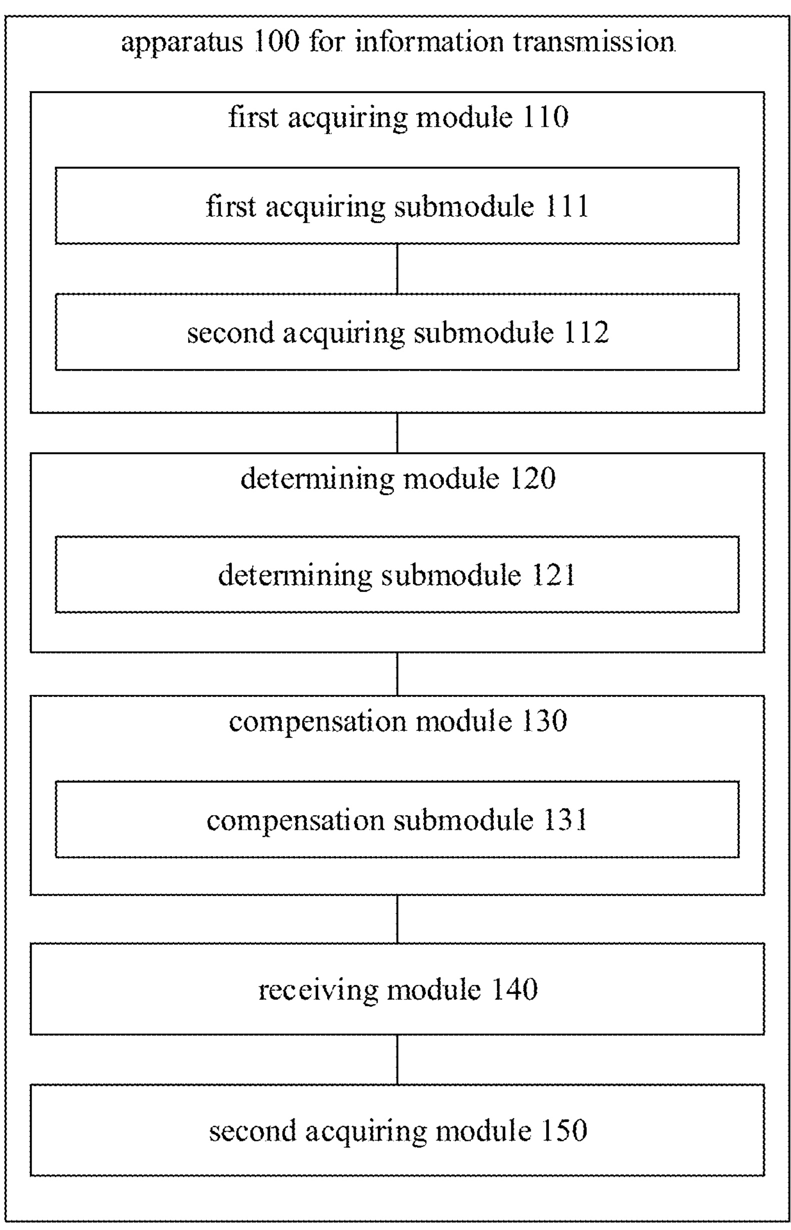
FIG. 4 is a block diagram illustrating an apparatus for information transmission according to an embodiment.

An apparatus for information transmission is further provided in the embodiments of the present disclosure, which is applied to the base station. FIG. 4 is a diagram illustrating the composition and structure of an apparatus 100 for information transmission according to the embodiments of the present disclosure; as illustrated in FIG. 4, the apparatus 100 includes a first acquiring module 110 and a determining module 120.

The first acquiring module 110 is configured to acquire weights corresponding to different input modalities.

The determining module 120 is configured to determine a processing result of input data based on the input data of at least one input modality and the weight of the input modality corresponding to each input data.

In an embodiment, the weights corresponding to the different input modalities are determined based on quality of service (QOS) of the different input modalities.

In an embodiment, the weights include:

a relative weight representing a proportion of each of the input modalities to all the input modalities;

or, absolute weights indicating importance degrees of the different input modalities using different weight values.

In an embodiment, the determining module 120 includes a determining submodule 121.

The determining submodule 121 is configured to determine the processing result of the input data based on the input data of at least one input modality received by the mobile communication network and the weight of the input modality corresponding to each input data.

In an embodiment, the first acquiring module 110 includes a first acquiring submodule 111 and a second acquiring submodule 112.

The first acquiring submodule 111 is configured to receive indication information for indicating the weights corresponding to the different input modalities.

The second acquiring submodule 112 is configured to acquire pre-agreed weights corresponding to the different input modalities.

In an embodiment, the apparatus 100 further includes a compensation module 130.

The compensation module 130 is configured to compensate for input data of at least one second input modality in the at least one input modality using input data of at least one first input modality in the at least one input modality based on the compensation rule.

In an embodiment, the compensation module 130 includes a compensation submodule 131.

The compensation submodule 131 is configured to compensate for QoS of the input data of least one second input modality using QoS of the input data of the at least one first input modality.

In an embodiment, the compensation rule is determined based on the weight of the first input modality and the weight of the second input modality.

In an embodiment, the apparatus 100 further includes at least one of a receiving module 140 or a second acquiring module 150.

The receiving module 140 is configured to receive indication information for indicating the compensation rule.

The second acquiring module 150 is configured to acquire a pre-agreed compensation rule.

In an embodiment, the first acquiring module 110, the determining module 120, the compensation module 130, the receiving module 140 and the second acquiring module 150, etc. may be implemented by one or more central processing units (CPUs), graphics processing units (GPUs), baseband processors (BPs), application specific integrated circuits (ASICs), digital signal processors (DSPs), programmable logic devices (PLDs), complex programmable logic devices (CPLDs), field-programmable gate arrays (FPGAs), universal processors, controllers, micro controller units (MCUs), microprocessors or other electronic components, or may be implemented in combination with one or more radio frequency (RF) antennas, to perform the above method.

Figure 5:
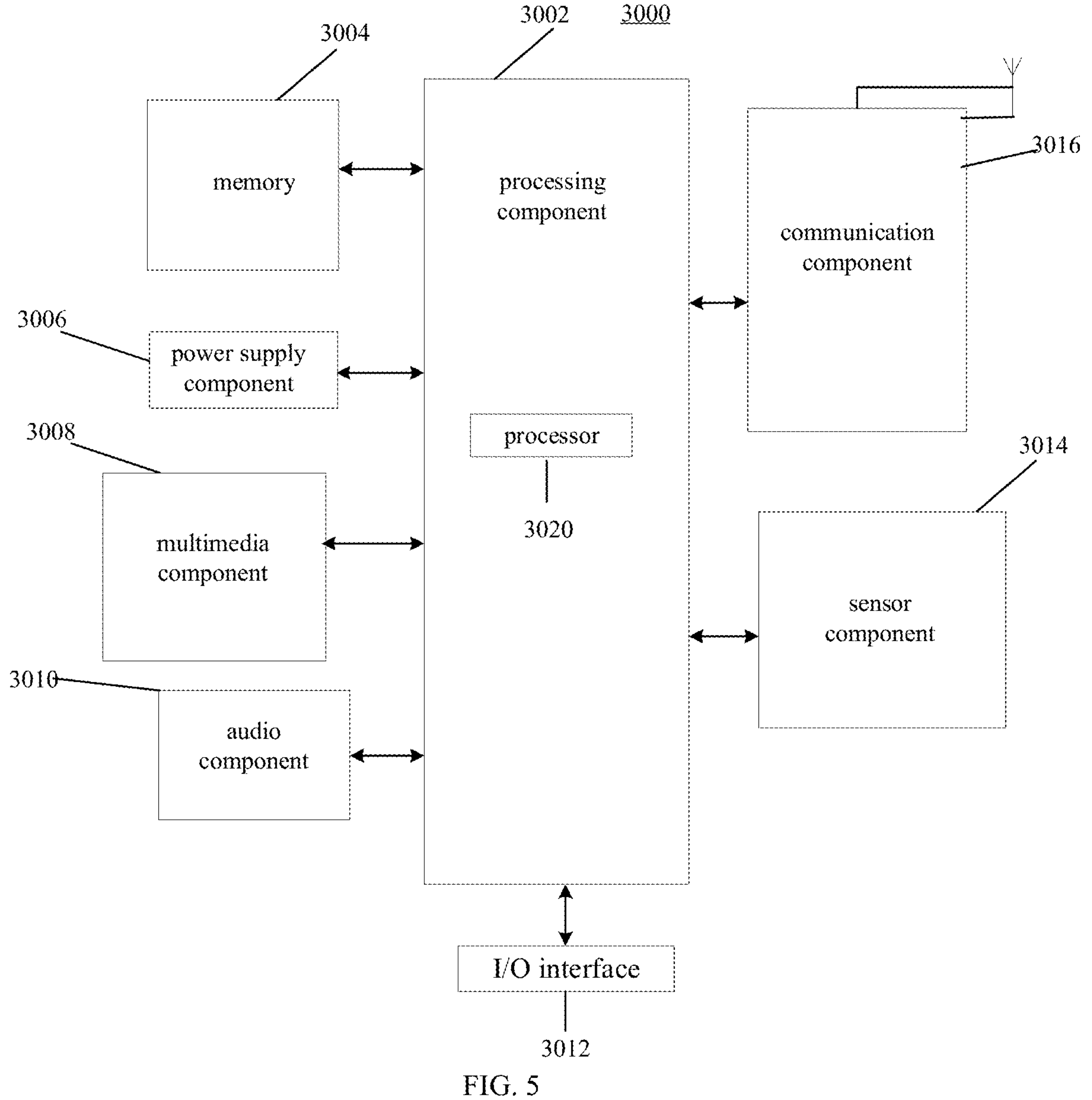
FIG. 5 is a block diagram illustrating a device for information transmission according to an embodiment.

FIG. 5 is a block diagram illustrating a device 3000 for information transmission according to an embodiment. For example, the device 3000 may be a mobile phone, a computer, a digital broadcasting terminal, a messaging device, a game console, a tablet device, a medical equipment, a fitness equipment, a personal digital assistant, etc.

As illustrated FIG. 5, the device 3000 may include one or more components: a processing component 3002, a memory 3004, a power supply component 3006, a multimedia component 3008, an audio component 3010, an input/output (I/O) interface 3012, a sensor component 3014, and a communication component 3016.

The processing component 3002 generally controls the whole operation of the device 3000, such as the operations related to display, phone call, data communication, camera operation and recording operation. The processing component 3002 may include one or more processors 3020 to perform instructions, to complete all or part of steps of the above method. In addition, the processing component 3002 may include one or more modules for the convenience of interaction between the processing component 3002 and other components. For example, the processing component 3002 may include a multimedia module for the convenience of interaction between the multimedia component 3008 and the processing component 3002.

The memory 3004 is configured to store all types of data to support the operation of the device 3000. Examples of the data include the instructions of any applications or methods operated on the device 3000, contact data, phone book data, messages, pictures, videos, etc. The memory 3004 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 3006 may provide power supply for all components of the device 3000. The power supply component 3006 may include power supply management system, one or more power supplies, and other units related to generating, managing and distributing power for the device 3000.

The multimedia component 3008 includes an output interface screen provided between the device 3000 and the user. In some embodiments, a screen may include a liquid crystal display (LCD) and a touch panel (TP). When the screen includes a touch panel, the screen may be implemented as a touch screen to receive input signals from the user. The touch panel includes one or more touch sensors to sense touch, slide and gestures on the touch panel. The touch sensor may not only sense the boundary of touch or slide action, but also detect the duration and pressure related to the touching or sliding operation. In some embodiments, the multimedia component 3008 includes a front camera and/or a rear camera. When the device 3000 is in operation mode, such as shooting mode or video mode, the front camera or the rear camera may receive the external multimedia data. Each front camera and rear camera may be a fixed optical lens system or an optical lens system with a focal length and an optical zoom capacity.

The audio component 3010 is configured as an output and/or input signal. For example, the audio component 3010 includes a microphone (MIC). When the device 3000 is in an operation mode, such as a call mode, a record mode, and a speech recognition mode, the microphone is configured to receive external audio signals. The audio signals received may be further stored in the memory 3004 or sent via the communication component 3016. In some embodiments, the audio component 3010 further includes a speaker configured to output an audio signal.

The I/O interface 3012 provides an interface for the processing component 3002 and the peripheral interface module, and the peripheral interface module may be a keyboard, a click wheel, a button, etc. The buttons may include but not limited to a home button, a volume button, a start button and a lock button.

The sensor component 3014 includes one or more sensors, configured to provide various aspects of state assessment for the device 3000. For example, the sensor component 3014 may detect the on/off state of the device 3000 and the relative positioning of the component. For example, the component is a display and a keypad of the device 3000. The sensor component 3014 may further detect the location change of the device 3000 or one component of the device 3000, the presence or absence of contact between the user and the device 3000, the orientation or acceleration/deceleration of the device 3000, and the temperature change of the device 3000. The sensor component 3014 may include a proximity sensor, which is configured to detect the existence of the objects nearby without any physical contact. The sensor component 3014 may further include a light sensor such as a CMOS or CCD image sensor, which is configured in imaging applications. In some embodiments, the sensor component 3014 may further include an acceleration transducer, a gyroscope sensor, a magnetic sensor, a pressure sensor or a temperature sensor.

The communication component 3016 is configured for the convenience of wire or wireless communication between the device 3000 and other devices. The device 3000 may access wireless networks based on communication standard, such as WiFi, 2G or 3G, or their combination. In an embodiment, the communication component 3016 receives broadcast signals or broadcast-related information from an external broadcast management system via a broadcast channel. In an embodiment, the communication component 3016 further includes a near field communication (NFC) module to facilitate short-range communication. For example, an NFC module may be implemented based on a radio frequency identification (RFID) technology, an infrared data association (IRDA) technology, an ultra-wideband (UWB) technology, Bluetooth (BT) technology and other technologies.

In an embodiment, the device 3000 may be implemented by one or more application specific integrated circuits (ASICs), digital signal processors (DSPs), digital signal processing devices (DSPDs), programmable logic devices (PLDs), field programmable gate arrays (FPGA), controllers, microcontrollers, microprocessors or other electronics components, which is configured to perform the above method.

In an embodiment, a non-transitory computer readable storage medium is further provided which includes instructions, such as the memory 3004 including instructions, wherein the instructions may be executed by the processor 3020 of the device 3000 to complete the above methods. For example, the non-transitory computer readable storage medium may be a ROM, a random access memory (RAM), a CD-ROM, a magnetic tape, a floppy disk, an optical data storage device, etc.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

After considering the specification and practicing the disclosure herein, those skilled in the art will easily think embodiment of other implementations. The present application is intended to cover any variations, usages, or adaptive changes of the present disclosure. These variations, usages, embodiment or adaptive changes follow the general principles of the present disclosure and include common knowledge or conventional technical means in the technical field embodiment not disclosed by the present disclosure. In addition, for those skilled in the art, replacements and modifications may be made on steps or modules in implementations of the present disclosure without departing from the principles of the present disclosure, and these replacements and modifications are also considered to be within the protection scope of the present disclosure. The description and the embodiments are regarded as exemplary.

It should be understood that the present invention is not limited to the precise structure described above and shown in the drawings, and various modifications and changes may be made without departing from its scope.

What is claimed is:

1. A method for information transmission, performed by a base station, comprising:

receiving indication information for indicating weights corresponding to different input modalities;

acquiring pre-agreed weights corresponding to the different input modalities;

determining, based on input data of a plurality of input modalities and a weight of an input modality corresponding to each input data, a processing result of the input data, wherein the plurality of input modalities comprise at least one first input modality and at least one second input modality; and in response to determining that second quality of service (QoS) of input data of the at least one second input modality decreases, compensating for a decreased amount of the second QoS by increasing a weight for first QoS of input data of the at least one first input modality, wherein the first or second QoS comprises a transmission delay and a transmission rate, wherein a compensation rule for the compensating is configured based on a corresponding relationship between the at least one first input modality and the at least one second input modality, and corresponding relationship indicates that a decrease in the at least one second input modality is to be compensated by increasing the at least one first input modality;

wherein the weights corresponding to the different input modalities are determined based on qualities of service of the different input modalities, and a weight corresponding to an input modality having a low QoS is higher than a weight corresponding to another input modality having a high QoS.

2. The method of claim 1, wherein the weights comprise:

a relative weight representing a proportion of each of the input modalities to all the input modalities;

or, absolute weights indicating importance degrees of the different input modalities using different weight values.

3. The method of claim 1, wherein the weight of the input modality with a high correlation degree with the processing result is high, and the weight of the input modality with a low correlation degree with the processing result is low.

4. The method of claim 1, wherein determining the processing result of the input data based on the input data of the plurality of input modalities and the weight of the input modality corresponding to each input data comprises:

determining the processing result of the input data based on the input data of the plurality of input modalities received by a mobile communication network and the weight of the input modality corresponding to each input data.

5. A communication device, comprising a processor, a transceiver, and a memory having an executable program stored thereon, wherein, when the executable program is executed by the processor, the processor is configured to:

receiving indication information for indicating weights corresponding to different input modalities;

acquiring pre-agreed weights corresponding to the different input modalities;

determine, based on input data of a plurality of input modalities and a weight of an input modality corresponding to each input data, a processing result of the input data, wherein the plurality of input modalities comprise at least one first input modality and at least one second input modality; and in response to determining that second quality of service (QoS) of input data of the at least one second input modality decreases, compensate for a decreased amount of the second QoS by increasing a weight for first QoS of input data of the at least one first input modality, wherein the first or second QoS includes a transmission delay and a transmission rate, wherein a compensation rule for the compensating is configured based on a corresponding relationship between the at least one first input modality and the at least one second input modality, and corresponding relationship indicates that a decrease in the at least one second input modality is to be compensated by increasing the at least one first input modality;

wherein the weights corresponding to the different input modalities are determined based on qualities of service of the different input modalities, and a weight corresponding to an input modality having a low QoS is higher than a weight corresponding to another input modality having a high QoS.

6. The communication device of claim 5, wherein the weights comprise:

a relative weight representing a proportion of each of the input modalities to all the input modalities; or, absolute weights indicating importance degrees of the different input modalities using different weight values.

7. The communication device of claim 5, wherein the processor is further configured to:

determine the processing result of the input data based on the input data of the plurality of input modalities received by a mobile communication network and the weight of the input modality corresponding to each input data.

8. A non-transitory storage medium having programs stored thereon, wherein, when the programs are executed by a processor, the processor is caused to implement:

receiving indication information for indicating weights corresponding to different input modalities;

acquiring pre-agreed weights corresponding to the different input modalities;

determining, based on input data of a plurality of input modalities and a weight of an input modality corresponding to each input data, a processing result of the input data, wherein the plurality of input modalities comprise at least one first input modality and at least one second input modality; and in response to determining that quality of service (QoS) of input data of the at least one second input modality decreases, compensate for a decreased amount of the second QoS by increasing a weight for first QoS of input data of the at least one first input modality, wherein the first or second QoS includes a transmission delay and a transmission rate, wherein a compensation rule for the compensating is configured based on a corresponding relationship between the at least one first input modality and the at least one second input modality, and corresponding relationship indicates that a decrease in the at least one second input modality is to be compensated by increasing the at least one first input modality;

wherein the weights corresponding to the different input modalities are determined based on qualities of service of the different input modalities, and a weight corresponding to an input modality having a low QoS is higher than a weight corresponding to another input modality having a high QoS.

* * * * *